United States Patent [19]

Fechalos

[11] Patent Number: 4,680,754
[45] Date of Patent: Jul. 14, 1987

[54] MULTI-FUNCTION BUS

[75] Inventor: William A. Fechalos, Naperville, Ill.

[73] Assignee: Rockwell International Corporation, El Segundo, Calif.

[21] Appl. No.: 740,372

[22] Filed: Jun. 3, 1985
(Under 37 CFR 1.47)

[51] Int. Cl.[4] .............................. H04J 3/02; H04J 3/12
[52] U.S. Cl. ...................................... 370/85; 370/110.1
[58] Field of Search .................. 370/110.1, 58, 85, 86, 370/59

[56] References Cited

U.S. PATENT DOCUMENTS

| | | | |
|---|---|---|---|
| 4,426,697 | 1/1984 | Peterson et al. | 370/85 |
| 4,535,448 | 8/1985 | Baxter et al. | 370/85 |
| 4,543,629 | 9/1985 | Carey et al. | 370/85 |
| 4,547,880 | 10/1985 | De Vita et al. | 370/85 |

Primary Examiner—Douglas W. Olms
Assistant Examiner—Curtis Kuntz
Attorney, Agent, or Firm—C. B. Patti; V. Lawrence Sewell; H. Fredrick Hamann

[57] ABSTRACT

This disclosure depicts a multi-function bus for use with a central processor system, user devices having user interfaces and a host switching interface unit. The multi-function bus has a first pre-determined number of transmit and receive lines connecting the central processing system, the user interfaces and the host interfacing unit. A second pre-determined number of channels on each of the transmit and receive lines is provided for on the multi-function bus. A multi-function bus includes the transfer of information to and from the host switching system both in a serial mode and in a parallel mode on the multi-function bus.

1 Claim, 24 Drawing Figures

FIG. 5

| LEVEL 1 | LEVEL 2 | LEVEL 3 |
|---|---|---|
| 1. Operating System | 1. Physical to logical Translation | 1. Service Request |
| 2. State Mapping | 2. Terminal Protocol Interface | 2. DC Signaling Translation |
| 3. Number Translations | 3. Data Formatting | 3. Encoded Signaling Translation |
| 4. Network Time Slot Assignment | 4. Multi-function Bus Administration | 4. Data Formatting |
| 5. Class of Service Translation | 5. Multi-function Bus Maintenance | 5. Maintenance Reporting |
| 6. CDR Data Collection | 6. Packet Assembly | 6. Digit Collection |
| 7. Call Management | | |
| 8. Traffic Statistics | | |
| 9. General Call Processing | | |
| 10. Primary Bus Maintenance | | |

CONTROL COMMAND TABLE

| FROM CPU TO INTERFACE | FROM INTERFACE TO CPU |
|---|---|
| 1. Connect Time Slot | 1. Request for Service |
| 2. Ring | 2. Flash |
| 3. Ring Distinctive | 3. Answer |
| 4. Trip Ring | 4. Digit Received |
| 5. Release | 5. Busy |
| 6. Seize | 6. Out of Service |
| 7. Answer | |
| 8. Register Attached | |
| 9. Set Pad | |
| 10. Test | |
| 11. Dial | |
| 12. Put In Service | |
| 13. Put Out of Service | |

FIG. 10

MULTI-FUNCTION BUS

BACKGROUND OF THE INVENTION

The present invention relates in general to a multi-function bus for use in an improved switching system and, in particular, to multi-function busses for use in an improved switcing system capable of assuming a plurality of personalities and capable of supporting a variety of user services such as voice, data, and video information.

Numerous computer controlled devices are known in the prior art which interface with user devices such as analog and digital telephones, user work stations, key system instruments, local area networks, and remote subscribers. Typically, such devices are custom designed to operate with specified user equipment.

Considering the present environment of different user equipment and the rapidly changing need for extended services, there exists a demand for an interfacing system which is flexible enough to service any of the variety of services. The system must be able to function as a stand-alone switching system or interface whatever the user equipment is, with a host switching systems such as an automatic call distributor, tandem switching, PBX or concentrator. Such a system does not presently exist in the prior art, and prior art switching systems are not capable of assuming personalities extending from small size to very large, and are not able to adapt to varying demands for band-width and control in the prior art.

In order that the device be economical and efficient, there is also a need for an information signal bus which can assume different personalities depending upon the application.

The present invention overcomes these deficiencies in the prior art.

OBJECTS OF THE INVENTION

It is a primary object of the present invention to provide a novel multi-function bus for use in a switching system in either a stand-alone mode or interfacing a host switching system with a variety of user equipment.

It is another object of the present invention to provide a multi-function bus which can assume multiple personalities.

It is a further object of the present invention to provide a multi-function bus which has both serial and parallel transmission capabilities.

It is yet another object of the present invention to provide a multi-function bus which is capable of servicing voice, data, and video information devices.

It is also another object of the present invention to provide a multi-function bus which is economical to manufacture.

SUMMARY OF THE INVENTION

The present invention involves a multi-function bus for use with a central processor system, user devices having user interfaces and a host switching interface unit. The multi-function bus has a first pre-determined number of transit and receives lines connecting the central processing system, the user interfaces and the host interfacing unit. A second predetermined number of channels on each of the transmit and receive lines is provided for on the multi-function bus. The multi-function bus includes the transfer of information to and from the host switching system, both in a serial mode, and in a parallel mode on the multi-function bus.

BRIEF DESCRIPTION OF THE DRAWINGS

The features of the present invention which are believed to be novel, are set forth with particularity in the appended claims. The invention, together with further objects and advantages, may best be understood be reference to the following description taken in conjunction with the accompanying drawings, the several figures of which like reference numerals identify like elements, and in which:

FIG. 5 is a table illustrating the functional operations of the different levels of the FIG. 4 diagram;

FIG. 10 is a table illustrating messages from user interfaces;

DESCRIPTION OF THE PREFERRED EMBODIMENT

Figure 1A:
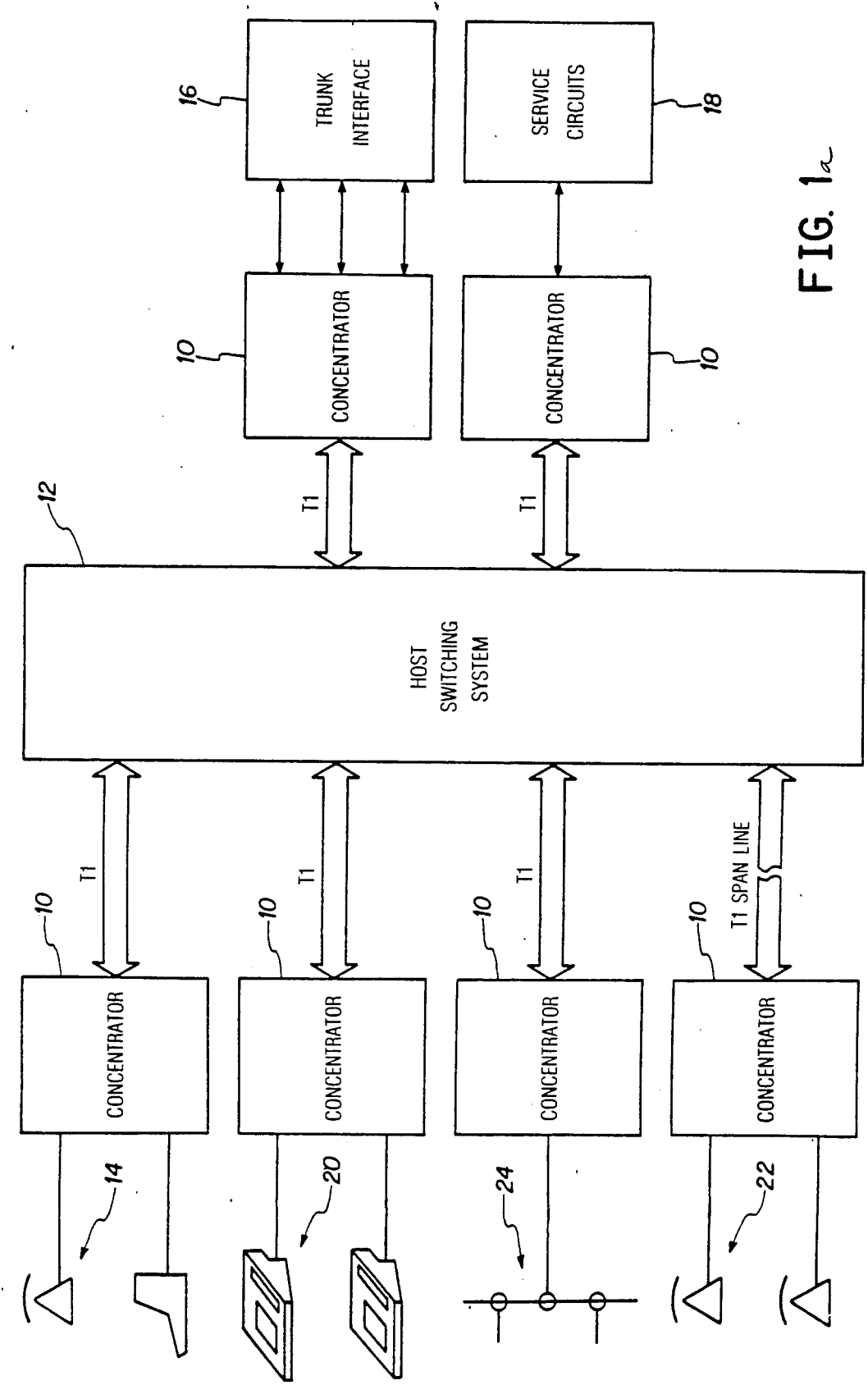
FIG. 1 is a general block diagram illustrating the connection of the novel invention with a host switching system and user devices.
FIG. 1b is a general block diagram of the novel invention assuming the personality of a stand-alone switch.
FIG. 1c is a general block diagram of the novel invention assuming the personality of an automatic call distributor.
FIG. 1d is a general block diagram of the novel invention assuming the personality of a tandem switch.
FIG. 1e is a general block diagram of the novel invention assuming the personality of a PBX.
Figure 1B:
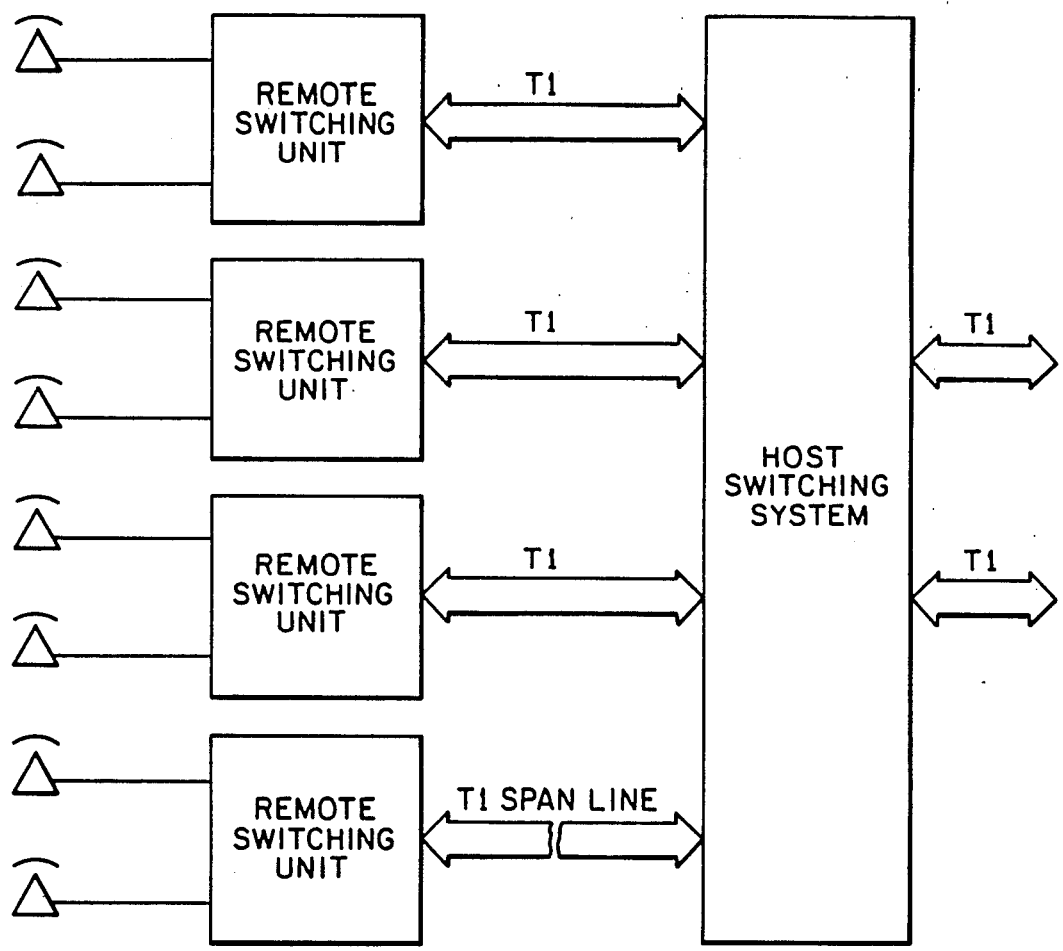
Figure 1C:
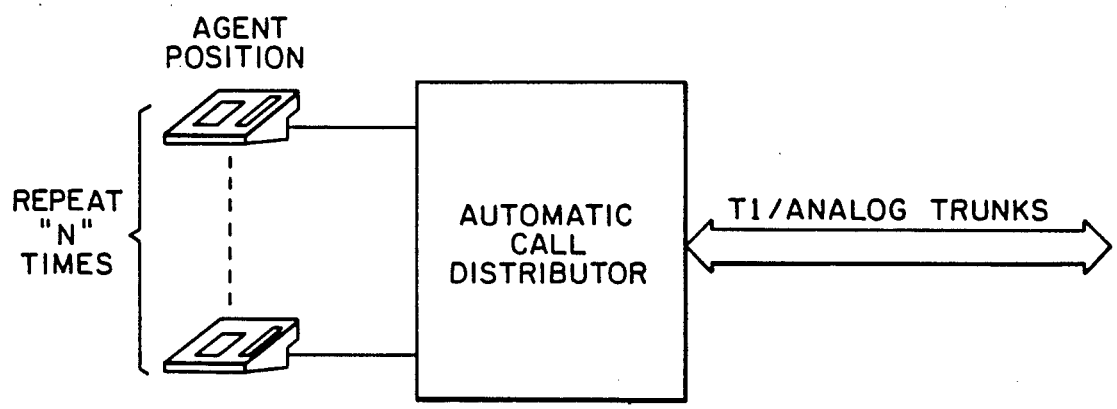
Figure 1D:
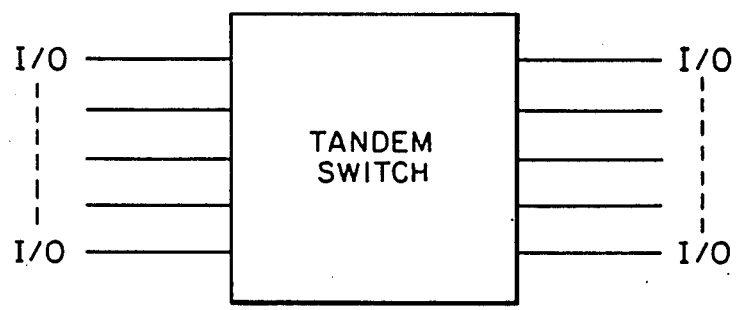
Figure 1E:
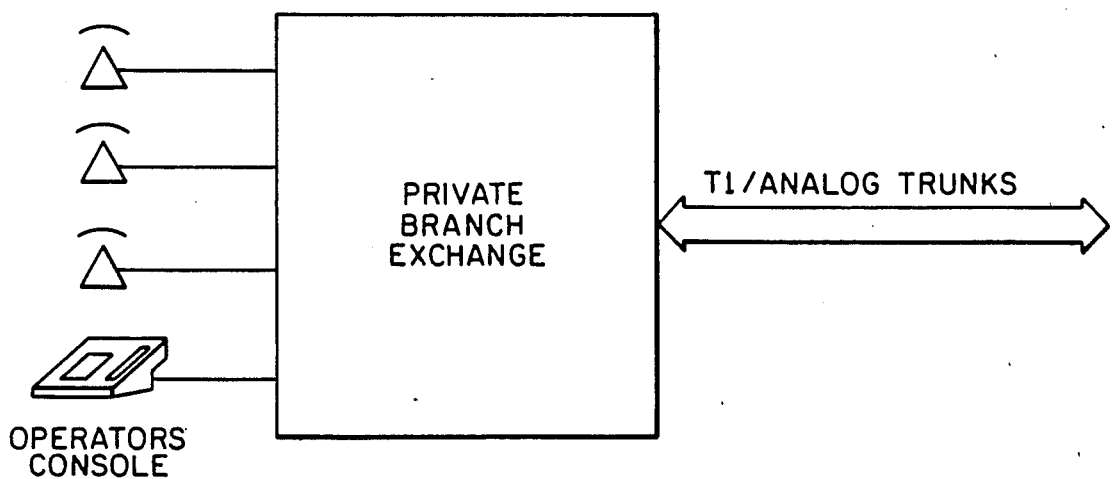

FIG. 1a shows the switching system assuming the personality of a concentrator. While this specification explains in detail the concentrator personality, it should be understood that the switching system of this invention may assume any one of a number of personalities, and examples are shown in FIGS. 1b through 1e.

The structure of the concentrator 10 lends itself to a variety of application configurations as shown in FIG. 1. When hosted by either a Galaxy or SCX switching system 12, 10 the switching system 10 can assume multiple personalities. Typically, the switching system 10 can be used to provide local area distribution for both analog and digital subscriber terminal equipment 14. In addition, the switching system 10 can terminate trunk interfaces 16 from both public and private networks. In a special application, the switching system 10 can be used to provide termination for system Service Circuits 18 such as Registers and Tone Sources. A shown in FIG. 1, all of these applications use T1 transmission facilities for inter-machine transport.

The inherent switching capabilities and the flexible control subsystem of the switching system make it suitable for stand alone applications. There, applications may include small tandem switches and key systems. The systems personality is determined by the circuit and the application software provided.

For applications which use an automatic call distributor or tandem switching system as a host in providing local distribution to subscriber terminals, the control functions of the switching system are minimal. Typical of the control functions of the switching system are as follows:

1. Recognition of requests for service from the interface units.
2. Assignment of T1 channels to connections.
3. Forwarding control messages to the host switch relating the originators identification and the assigned T1 channel.
4. Continuous updating of the host switch control system with interface circuit state changes. (Telephony signaling events).
5. Translation of control messages from the host switch control system and invoking the proper command to the interface circuit such as:
   (a) Ring
   (b) Seize
   (c) Release
6. Exchange of maintenance and status information with the host switch control system.

In general, the concentrator control subsystem is a slave pre-processor of telephony signaling events for the host switch control system. The host switch control system is responsible for performing all of the call processing and administrative functions.

In applications where the CONCENTRATOR 10 is hosted by a larger switching system, local (intra-concentrator) switching is not required. All connections intra- and inter-concentrator utilize the T1 channels through the host switching network. This reduces the software overhead in both control systems by eliminating redundant connection mapping and time slot contention arbitration.

When used for terminating key telephone subscriber 20, the concentrator control system is equipped with a higher level if intelligence. The concentrator control sub-system is provided with a data base which contains the information unique to the key system subscribers being served by the concentrator control subsystem for this application. The concentrator control sub-systems. For this application, the elements of the data base are as follows:

1. Key Group Assignments;
2. Key Function Assignment per Station and Key
3. Lamp, Display, and Ringing Control;
4. Call Origination and Supervision Processing;
5. Call Processing for local intercom calls;
6. Recent Changes, Administration, and Maintenance.

The switching function of the concentrator configured as a key system requires local connections for both concentrator intercom and bridges (non-privacy) calls. Switched access to the T1 channels provides trunk and inter-concentrator intercom call capability via the host switching system network.

In a large system, distributing the key system control function to each concentrator limits the size of any one key group to 192 subscribers. This is not considered detrimental in view of the potential for stand-alone operation.

The concentrator configured for key system operation is essentially a stand-alone subsystem. Its interface to the host switch provides access to trunk groups and interconcentrator intercom calls. Equipping the concentrator with access trunks would allow the unit to function as a stand-alone key system. The concentrator may be used to provide service circuit 18 termination for the Galaxy switching system. Digital tone sources, registers, and register senders can be installed in the concentrator and linked to the switching and control subsystems of the Galaxy via the T1 channels. In this application, the concentrator control subsystem assumes a relatively passive role. The concentrator control is slave to the host switch for sending and receiving DTMF and MF dialing in applying the appropriate call progress signals to connections. The switching functions of the concentrator in this application are limited to T1 channel access under the control of the host switch control system.

For remote subscribers 22 and as a remote switching unit, the concentrator control subsystem is provided with a substantial amount of call processing intelligence. In addition, software is provided for administration and extended maintenance capabilities. The function is not performed by the concentrator or deferred to the host switching system. Typical deferred functions are:

1. Packet Routing;
2. Call Management
3. CDR Data Collection and Reporting;
4. Attendant Functions;
5. Traffic Statistics;
6. Administration.

The switching requirements for the remote switching unit include local connections and access to the host switch via the T1 facilities. The T1 facilities serve as transport for all communications between the remote switching unit and the host switching system 12. Several T1 channels are reserved for processor intercommunication and for user voice and high-speed data transport.

When T1 facilities are not available, linkage to the host switching system 12 is provided by analog trunks. The control and packet data are extended to the host via high-speed (9.6KB) modems.

The ability to provide direct switched interface to local area networks (LAN) 24 such as ethernet is inherent in the concentrator design. An interface module equipped with an IEEE 802 compatible interface provides both packet and circuit switch access to the LAN. The ability to assign variable bandwidths to the interface will allow both high-speed and low-speed access to the LAN peripherals. The LAN interface may be associated with any of the concentrator configurations. The concentrator control needs only to establish a circuit switch or a virtual packet switched connection from either a local or remote subscriber over the T1 or local switching network to the LAN interface port. The LAN interface module is self-sufficient with an onboard processor whose capability includes protocol conversion. This ability relieves the common control subsystem from this responsibility and associated overhead.

Figure 2:
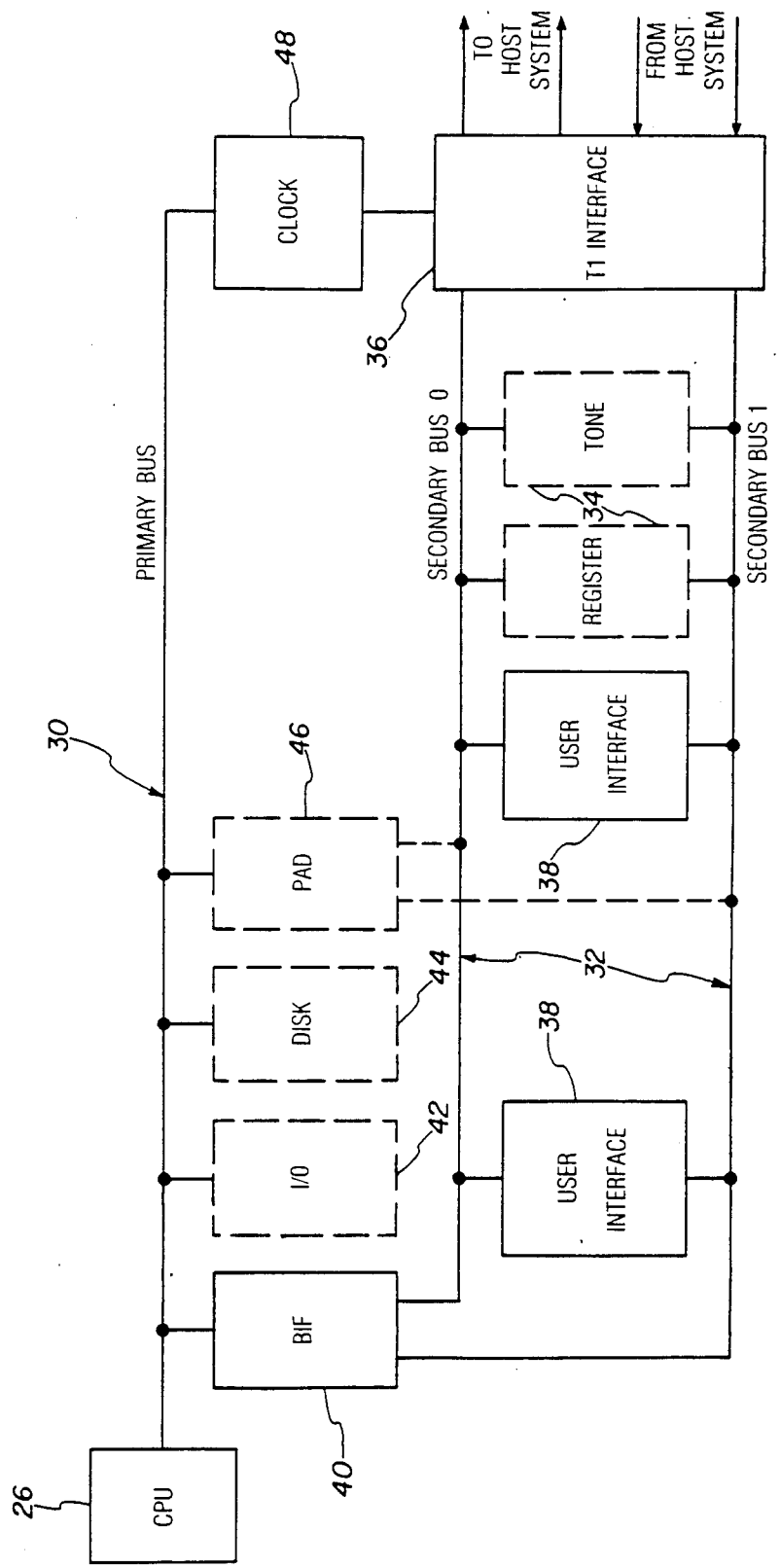
FIG. 2 is a general block diagram of the primary modules in the concentrator.
Figure 3:
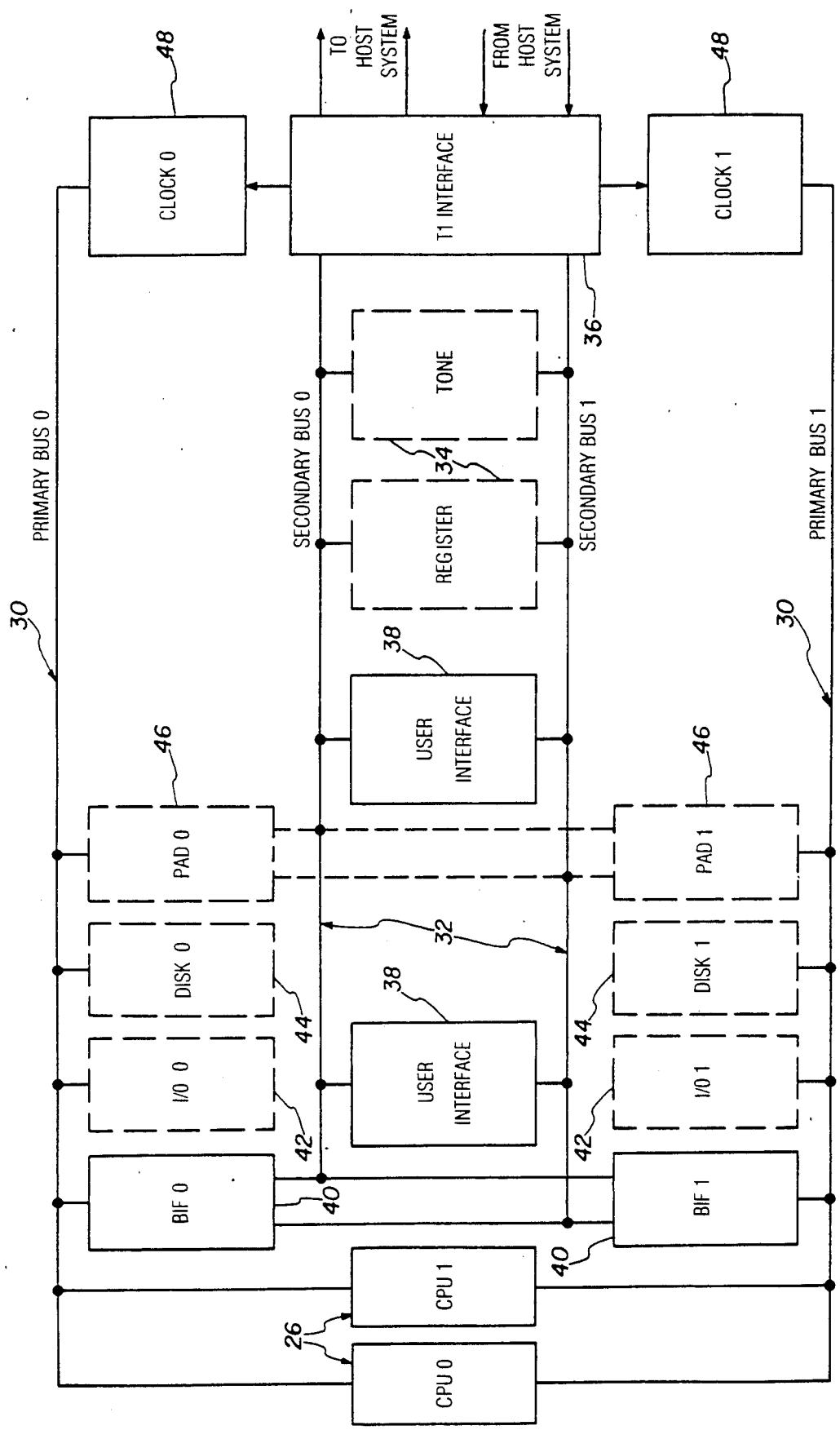
FIG. 3 is a general block diagram of the major elements of the concentrator in a duplix configuration.

FIG. 2 depicts the structure of the concentrator. The concentrator module consists of control subsystem, consisting of a central processing unit 26 and a primary bus 30, a multi-function bus 32, support modules, provisions for service circuits 34, T1 interfaces 36, and subscriber interface units 38. This module provides service for one and two user ports concentrated to 48 T1 channels which link the concentrator to the host switching system. This module is simplex, and can be used in an associated or stand-alone configuration. Duplex capability is provided by adding a second module as shown in FIG. 3. The duplex configuration provides 384 user ports concentrated to 96 T1 channels. The duplex configuration provides redundancy of common control equipment to enhance system availability.

As shown in FIG. 2, the concentrator is based on a two bus structure. The primary bus 30 is a high-speed duplex serial HDLC link between the central processing unit (CPU) 26 and its appended support module. The support modules. The support modules consist of the bus interface (BIF) 40, input/output (I/O) 42, disc interface (DISC) 44, packet assembler/dissembler (PAD) 46, and the clock generator (CLK) 48.

The BIF 40 is an intelligent module that performs transistion processing between the multi-function bus 32 supporting the user interfaces 38, and the CPU 26. When equipped, the I/O module 42 provides interface between external peripheral devices such as CRT switch printers, modems, and tape units, and the CPU 26. The disc 44 provides for system IPL and backup and stand-alone concentrator applications. The PAD 46 when required, deals with the packet switching and transmission capabilities of the concentrator. The CLK 48 receives input from the TI interfaces 36, and generates all of the internal clock, reset, and strobe signals used by the concentrator.

The multi-function bus 32 is a parallel bus structure which performs multiple functions. Shown in FIG. 2, the multi-function bus 32 links the user interfaces 38 to the TI interfaces 36, and the BIF 40. The multi-function bus 32 provides the switching function for both local (intra-concentrator) and remote (via T1) voice and data connections. Control access from BIF 40 to the user interfaces 38 is also supported by the multi-function bus 32. The multi-function bus 32 is duplicated for reliability, and is switched under the control of the BIF module 32.

FIG. 3 shows the duplex configuration of the concentrator. As is shown, the CPU and its support modules are duplicated on separate primary busses. Depending on the application, the redundant set of circuit cards may be installed, however, the full set of user interfaces can be used without including the full redundancy.

Figure 4:
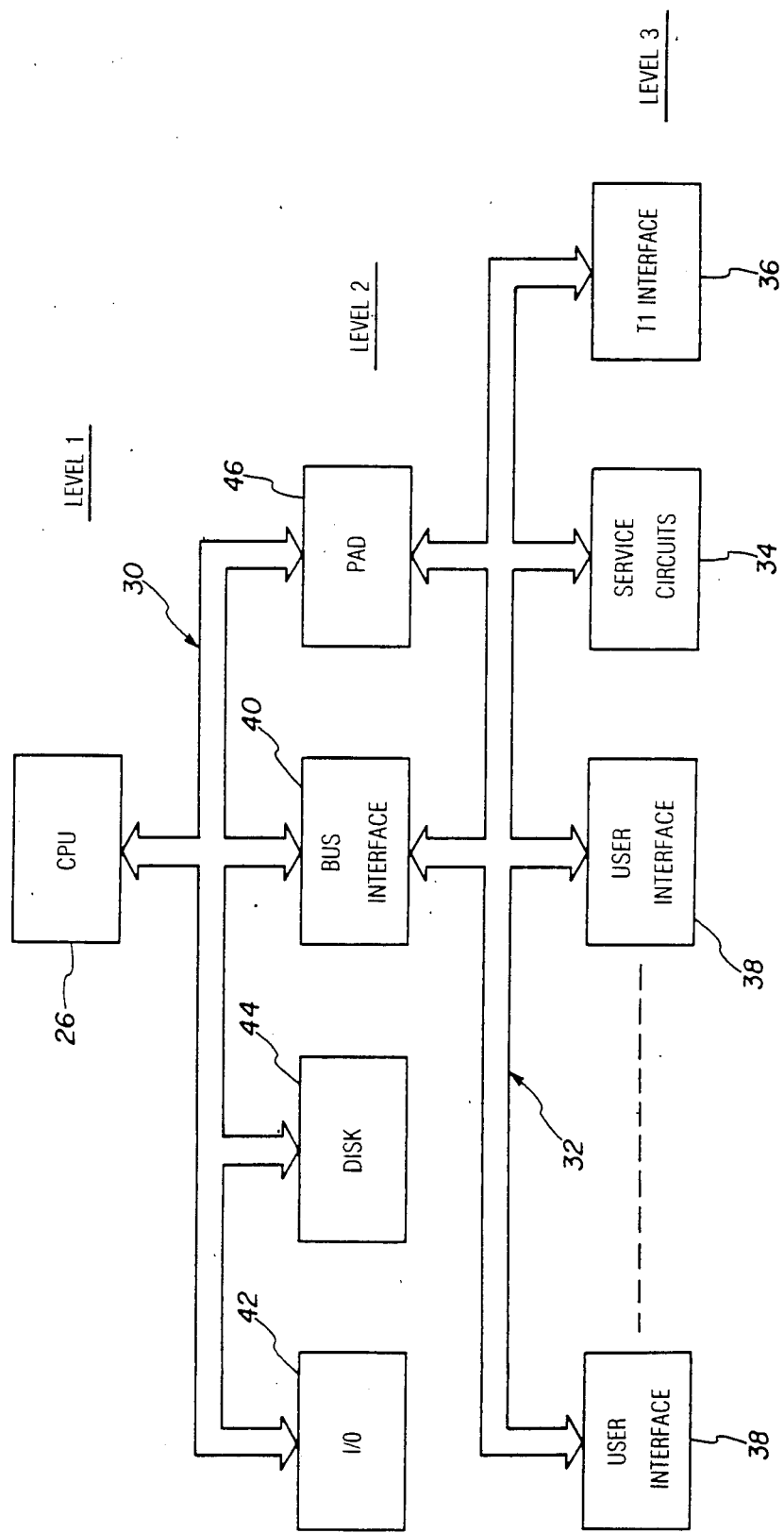
FIG. 4 is a block diagram illustrating the levels of operation in the concentrator.

The generic structure of the concentrator control system employs a centralized processor with distributed functional preprocessors. Each of the circuit modules have onboard intelligence. FIG. 4 shows the distribution of processing capability and FIG. 5 identifies the major function performed by the various processing elements.

The lowest level (level 3) of processing appears in the user interfaces 38. This processor performs a translation from DC or encoded signaling information to a high level command format which is universal to all interfaces. The high level commands are then forwarded to the concentrator control subsystem via the bus interface 40. The second level of processing (level 2) appears on the bus interface module 40. This interface 40 provides the linkage from the control subsystem (primary bus 30) to the switching network control (multi-function bus) serving the user interfaces. Physical to logical translation, interface scanning, error detection, and the time synchronization are the typical functions provided at this level. The highest level of processing (level 1) in the concentrator is the control subsystem processor 26. Depending on the application of the concentrator, the amount of processing required at this level will vary. This processor is linked via T1 channel to the host switch processor in all cases except stand-alone 36.

Figure 6:
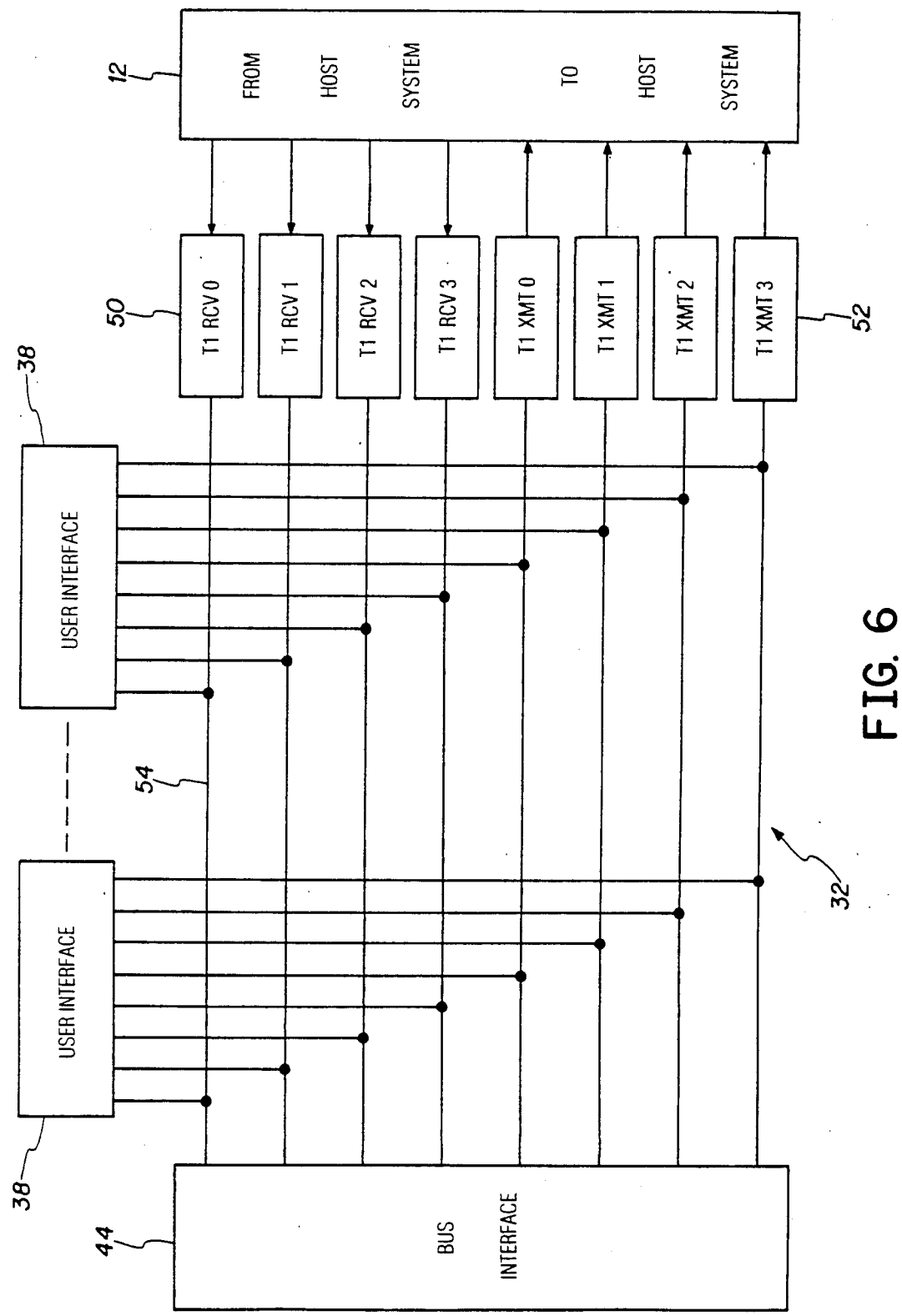
FIG. 6 is a block diagram illustrating the multi-function bus connection used in the concentrator.

In the preferred embodiment, the multi-function bus 32 is used in both a serial and parallel format. Intra-concentrator (local) connection uses the multi-function bus as a parallel structure. Connections via the T1 channels are transported on the multi-function bus 32 in a serial format. As shown in FIG. 6, the multi-function bus 32 is configured from the terminations of up to 4 T1 circuits 50 for receiving and 4 T1 circuits 52 for transmitting linking the concentrator to the host switching system. The 4 T1 circuits provide 96 duplex 64KB channels. These 96 channels appear serially on the 8 busses 54 comprising the multi-function bus 32. The 96 duplex channels are split into 4 transmit lines and 4 receive lines. Each of the 8 lines 54 carries 24 64KB channels. Each frame consists of 8 bits or 192 bits total for 24 channels to which one bit is appended for framing.

In the preferred embodiment, a frequency multiplier on the clock module 48 generates 6.176 mb, 3.088 mb, and 1.544 mb signals from the incoming 1.544 mb T1 bit stream. These clocks are distributed as required to the user interfaces 38 and the various control circuits which connect to the multi-function bus 32.

Figure 7:
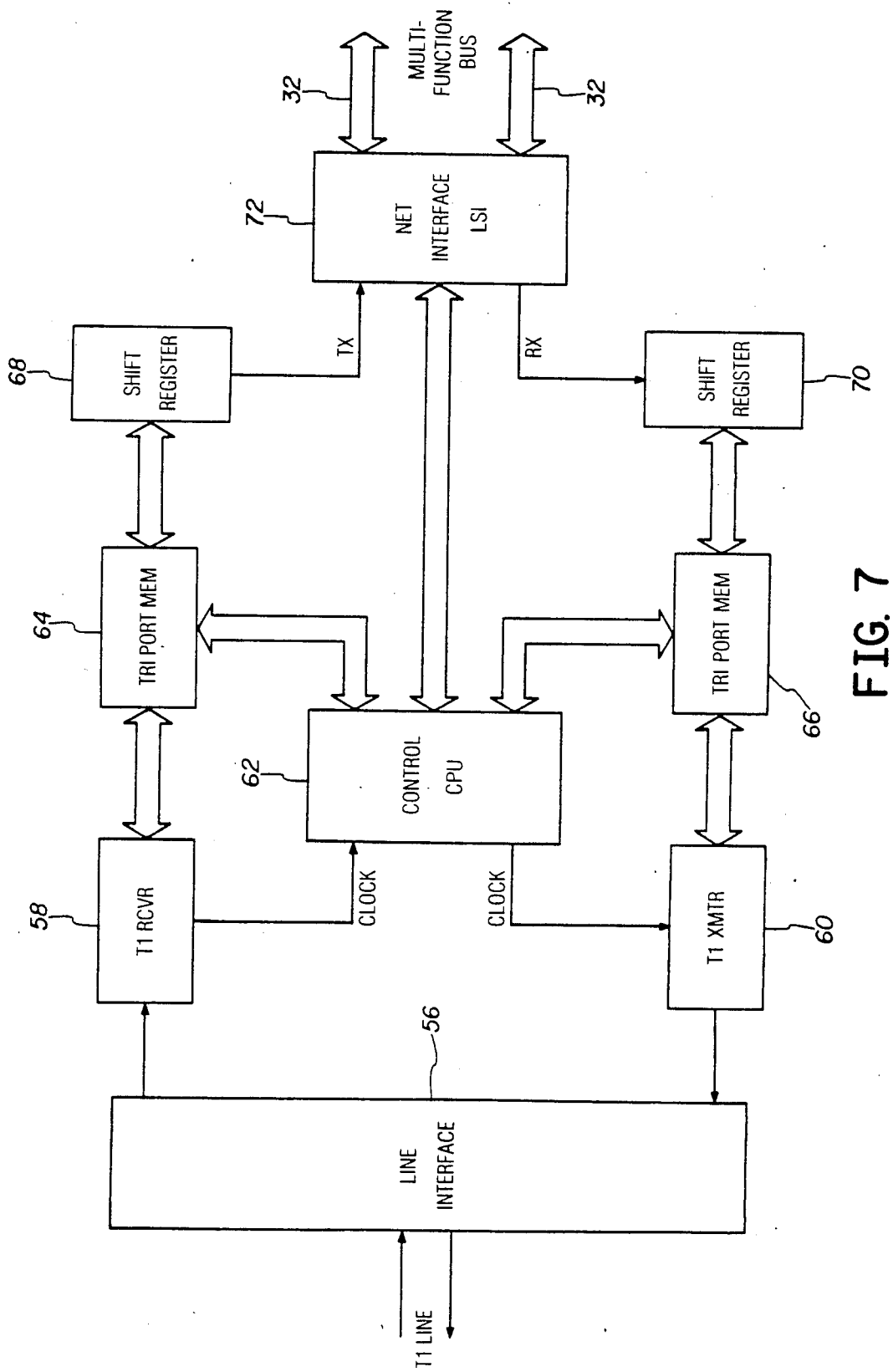
FIG. 7 is a block diagram of the interfacing circuitry used to interface with the host switching system.

FIG. 7 shows the major elements of the T1 interface 36. This interface 36 terminates one T1 line used to interconnect the concentrator 10 to the host system 12. The interface 36 has a means 56 for converting information signals on the T1 line from bi-polar to uni-polar, and provides line equalization. The receiving means 58 recovers clock, framing, and alarm signals, from the information signal and is operatively connected to the means 56. The means for transmitting 60 transmits the information and receives parallel input and generates serial output and is operatively connected to the means 56. Signalling, alarms, and zero code suppression are its attributes. A processor means 62 is provided for controlling the information signal and receiving a clock signal from the receiving means 58, and transmitting a clock signal to the transmitting means 60. First and second tri-port memory means 64 and 66 are used for buffering and are operatively connected respectively to the receiving means 58, and to the transmitting means 60. Both tri-port memory means 64 and 66 are operatively connected to the processor means 62. A first shift register 68 provides a transmit signal and is operatively connected to the first tri-port memory means 64. Similarly, a second shift register 70 is used for accepting a receive signal and is operatively connected to the second tri-port memory means 66. Finally, a network interface means 72 is used for interfacing the transmit and receive signal with the multi-function bus 32, and is operatively connected to the processor means 62.

Figure 8:
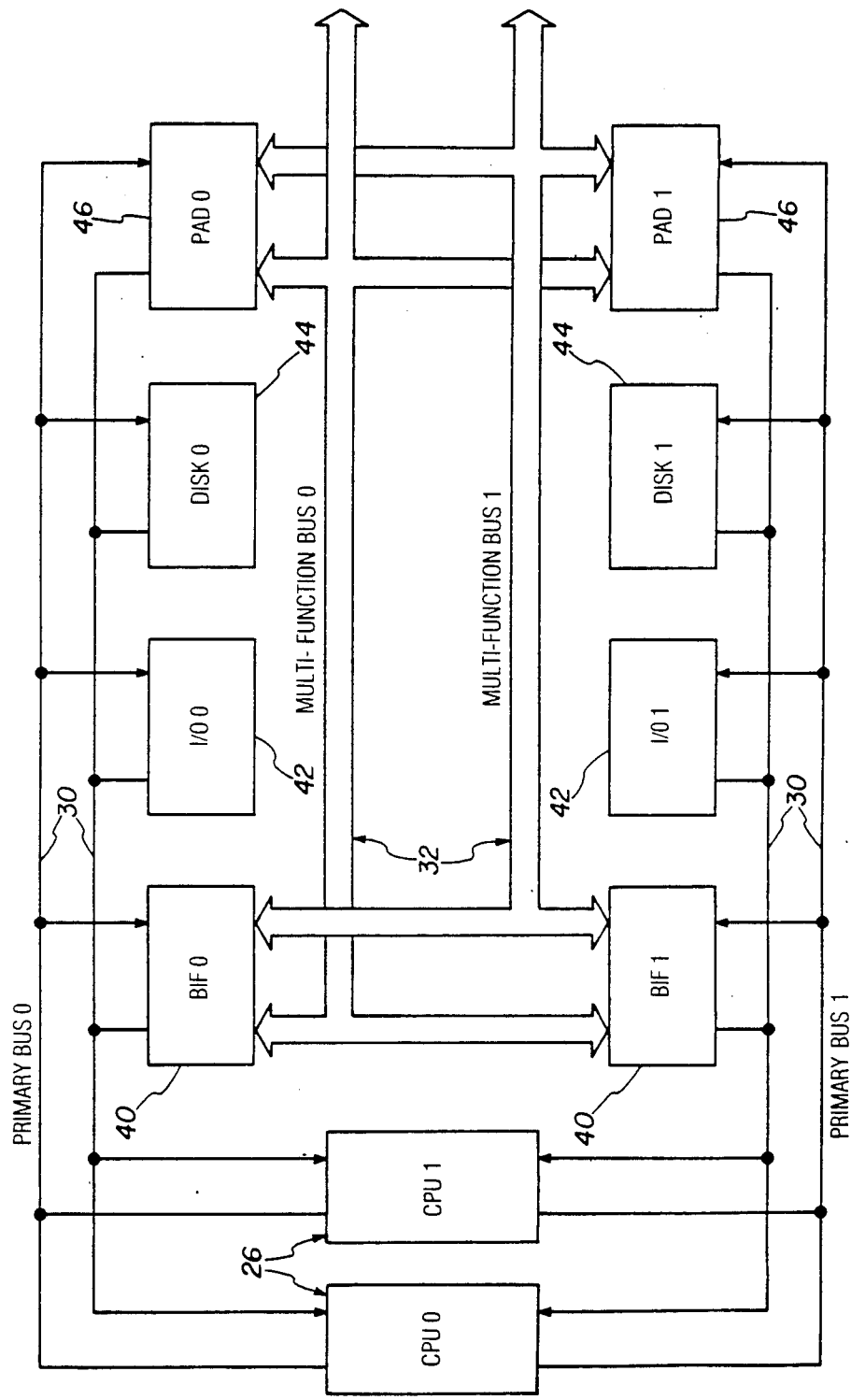
FIG. 8 is a general block daigram of the operation portion of the concentrator.

FIG. 8 shows the configuration of the concentrator control subsystem. Though shown in a redundant structure, the control may be operated simplex by removing the supplicated modules. The linkage between the central processing unit (CPU) 26 and the support modules is a full duplex serial transmission facility using HDLC. The serial link is clocked at 3.088 mb, which is derived from the received T1 clock. The serial primary bus 30 is used in a "poll-response" mode with a CPU 26 being the master. All information exchanged between the CPU 26 and its support modules is transported on the serial primary bus 30.

In its simplest form, the concentrator control subsystem consists of the CPU 26 and a bus interface (BIF) module 40. The BIF 40 provides the link between the serial bus (primary bus) 30 and the previously described multi-function bus 32.

The disc interface (DISC) 44 input/output (I/O) 42, and the packet assembler/disassembler (PAD) 46 modules are appended to the control system as the application requires.

Two T1 channels are assigned to provide data transport between the concentrator and the host system. The concentrator CPU 26 has access to the T1 channels transmit and receive via the BIF module 40 which terminates on the multi-function bus 32. The data format on the 64KB channels is HDLC.

Figure 9:
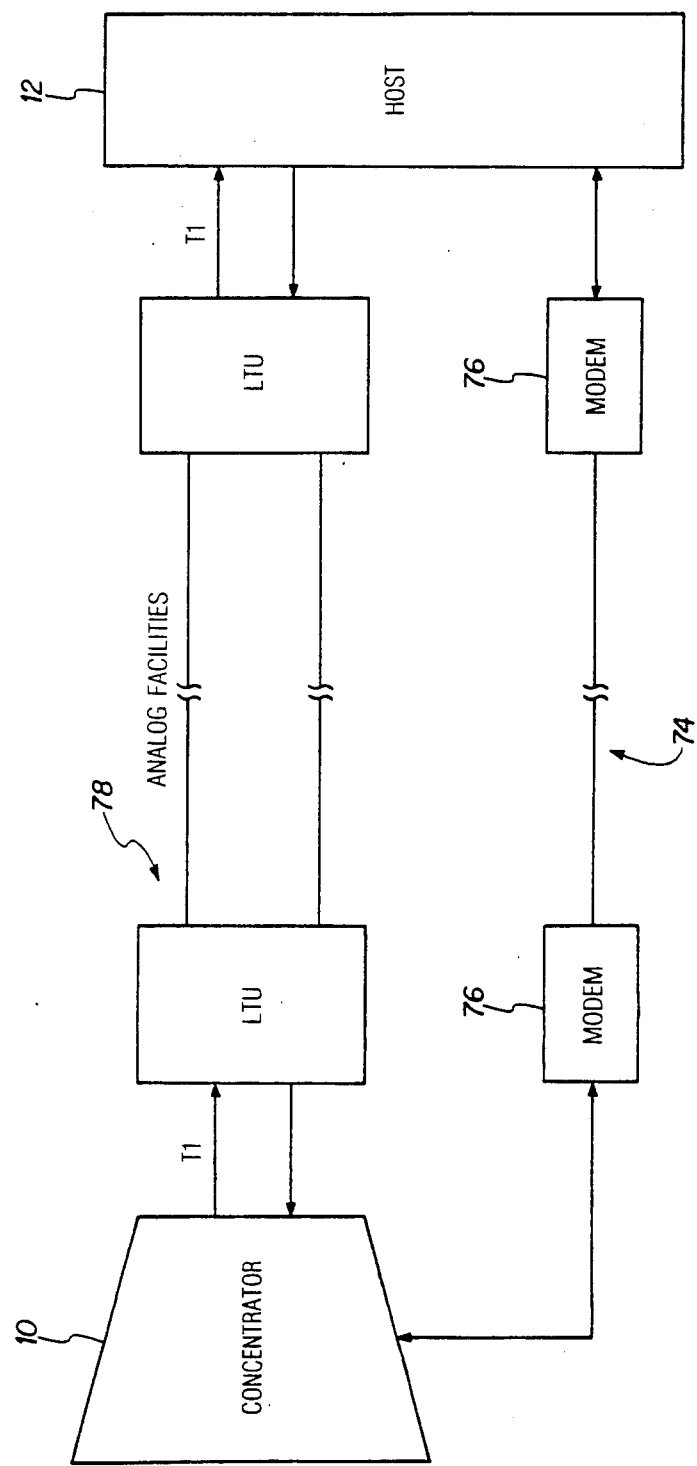
FIG. 9 is a general block diagram illustrating an alternative connection for the concentrator with the host switching system.

Although the concentrator is optimized around the use of T1 facilities for linkage to the host system, analog facilities may be used. FIG. 9 shows the analog facilities required to provide the voice and data channels when T1 facilities are not available. The data channels 74 is equipped with high-speed (9.6KB) modems 76, while the remaining channel 78 utilizes conventional 2-wire or 4-wire analog transmission circuits. The signaling for the analog transmission circuits is carried over a data channel.

The operation of the concentrator control system is based on a multi-level processing format. Each module of the concentrator has on-board intelligence with varys with the interface functions it performs. At the lower level, the user interfaces 38 are conditioned to process telephony signaling events.

The processing of the telephony signaling at the interface level, relieves the CPU 26 of dealing with real-time events. Another attribute of processing at the user interface 38 level is the resultant control message format which provides uniformity to the higher processing levels. FIG. 10 provides a list of control messages which are sent and received at the user interface 38. Each user interface 38 will use a subset of the control messages depending on the specific type of user service being provided.

The second level of processing occurs in the BIF module 40. The BIF 40 is chartered with scanning the user interfaces 38, reformatting the control messages, appending information to the control message and forwarding the composed message to the concentrator CPU 26. Messages received from the CPU 26 are interpreted by the BIF 40, reformated, and sent to the particular interface circuit 38. These actions performed by the BIF 40 further isolate the CPU 26 from the user interfaces 38, and off-loads the interface scanning maintenance and administration functions from the CPU 26.

The highest level of processing in the concentrator is retained by the CPU 26. At the CPU level, data base management, network mapping, state mapping and host system interface are the major tasks to be performed.

Overall, the concentrator control system is structured to serve a variety of applications with minimum impact on the interfaces 38. The partition levels of processing distribute the total processing in a functional basis with minimal interaction due to the high level of control message format.

Figure 11A:
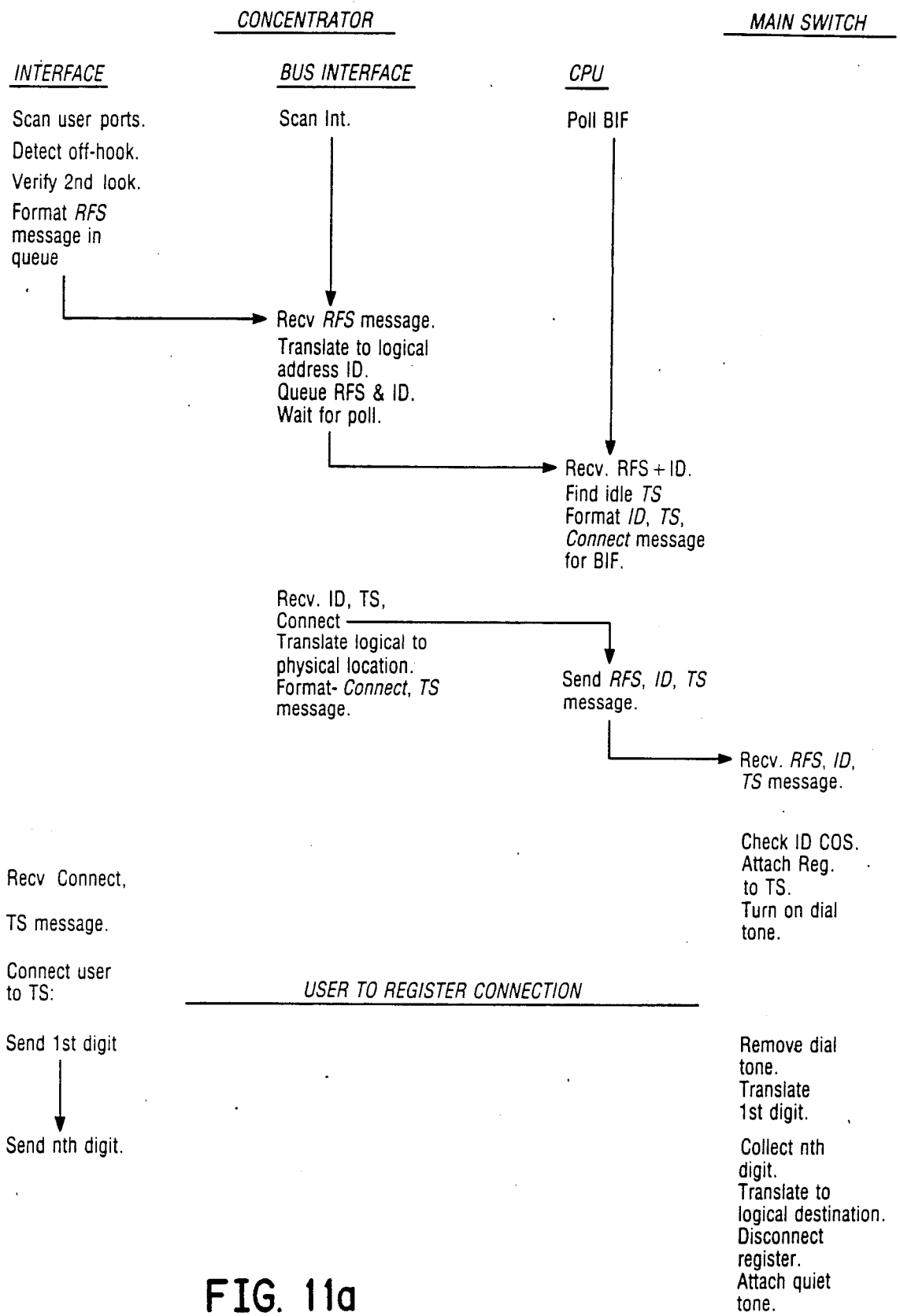
FIGS. 11(a)–11(b) and 12(a)–12(b) are flow charts depicting message flow to and from the user interfaces.
Figure 11B:
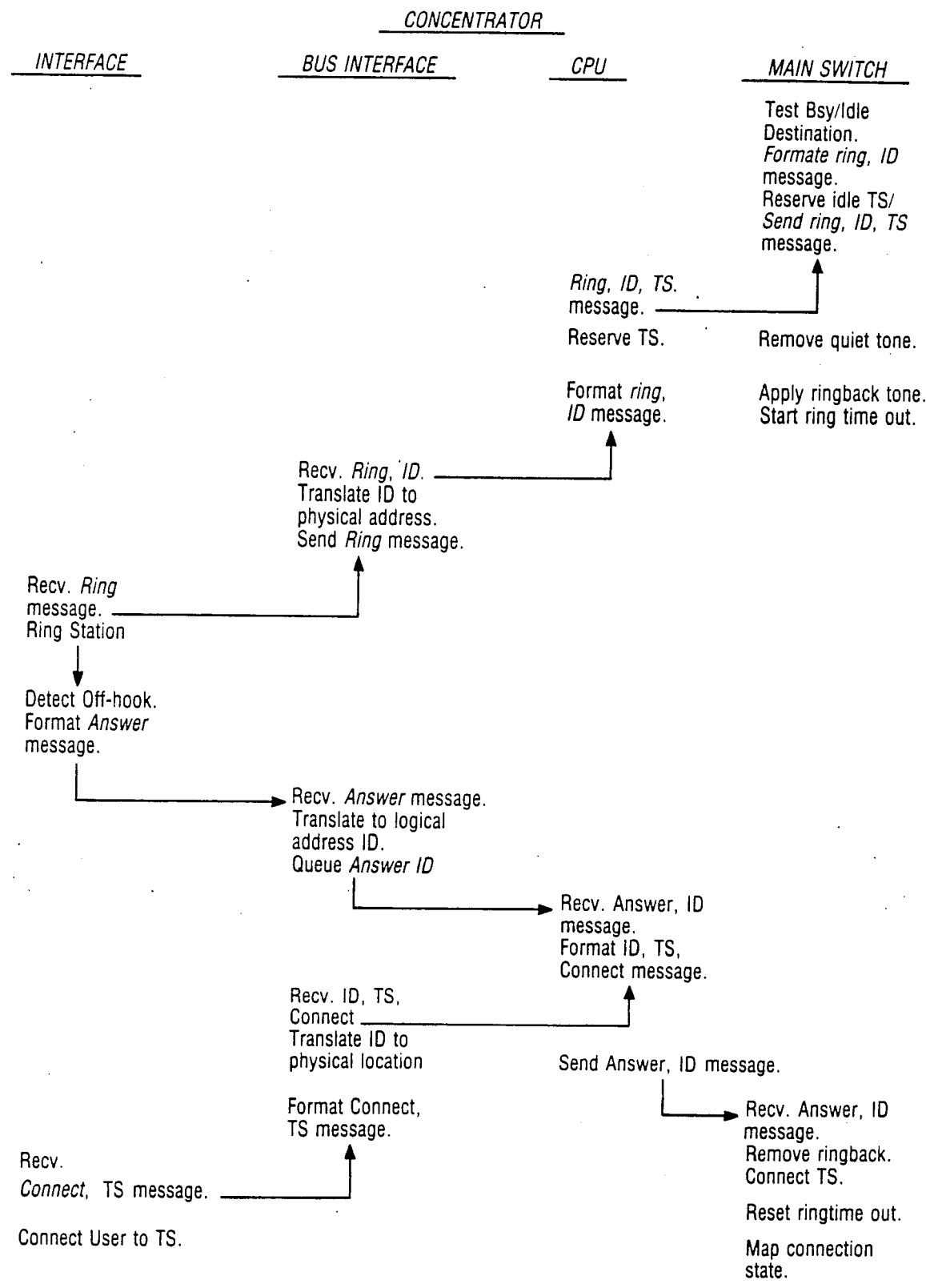
Figure 12A:
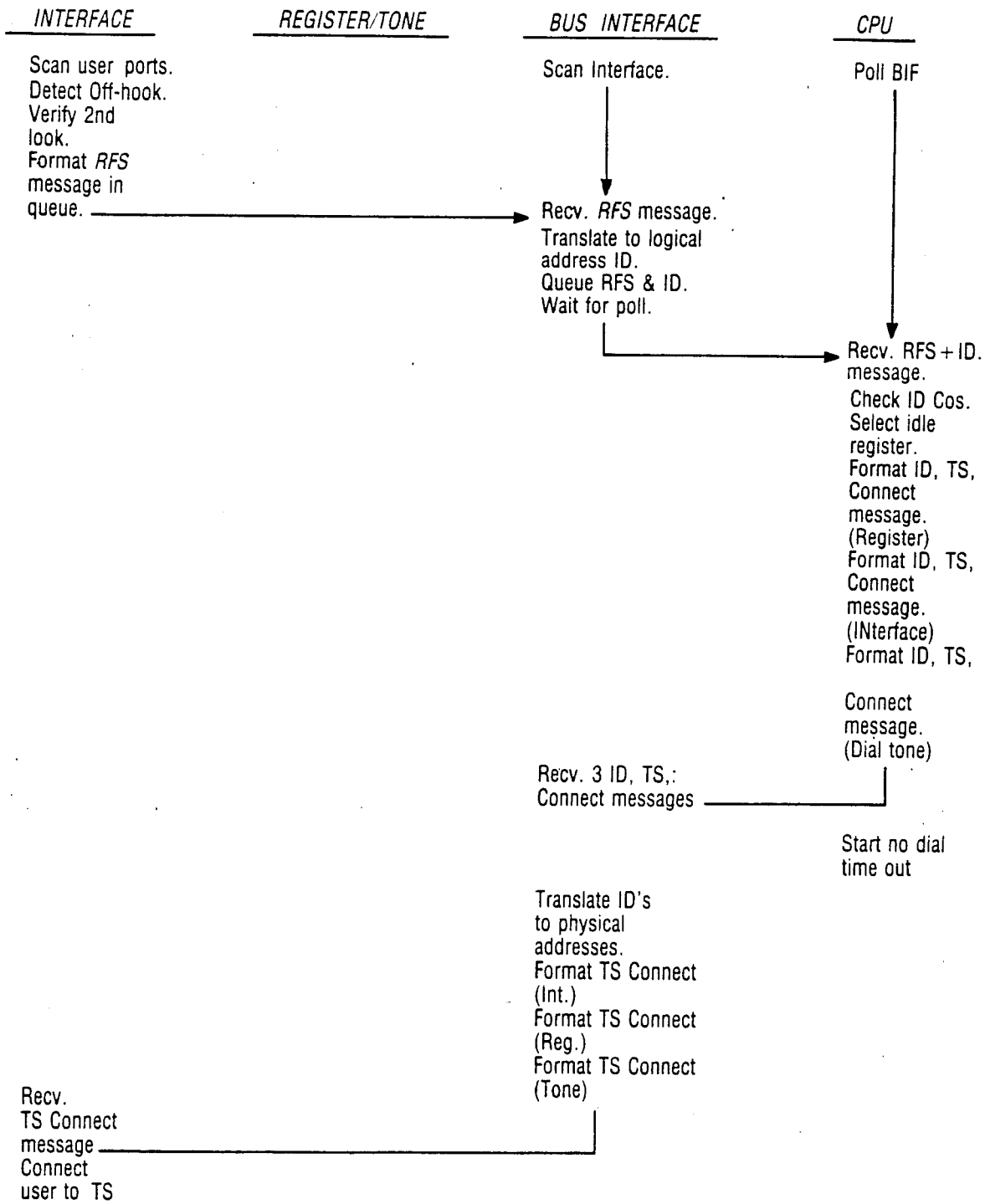
Figure 12B:
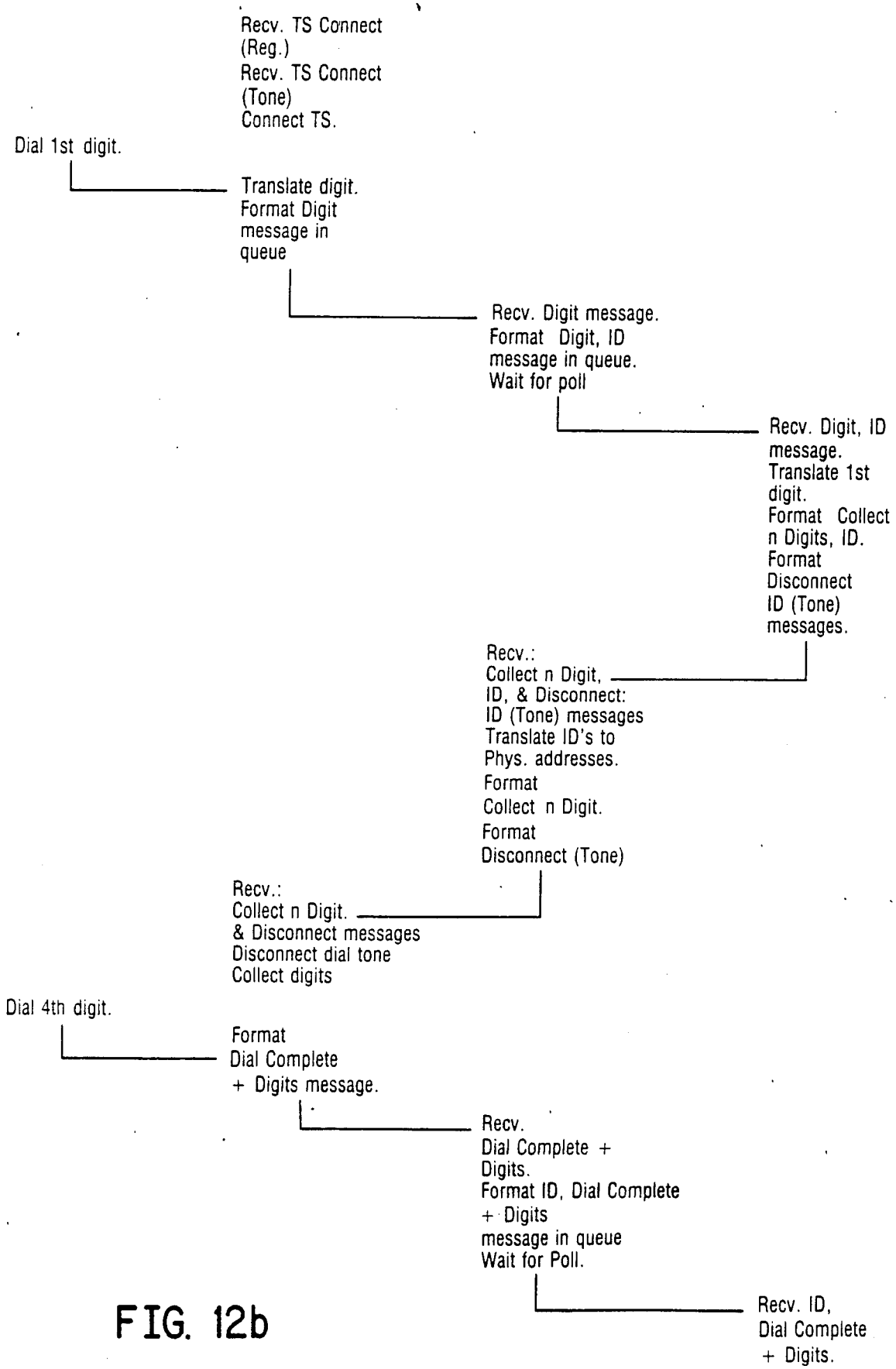
Figure 12C:
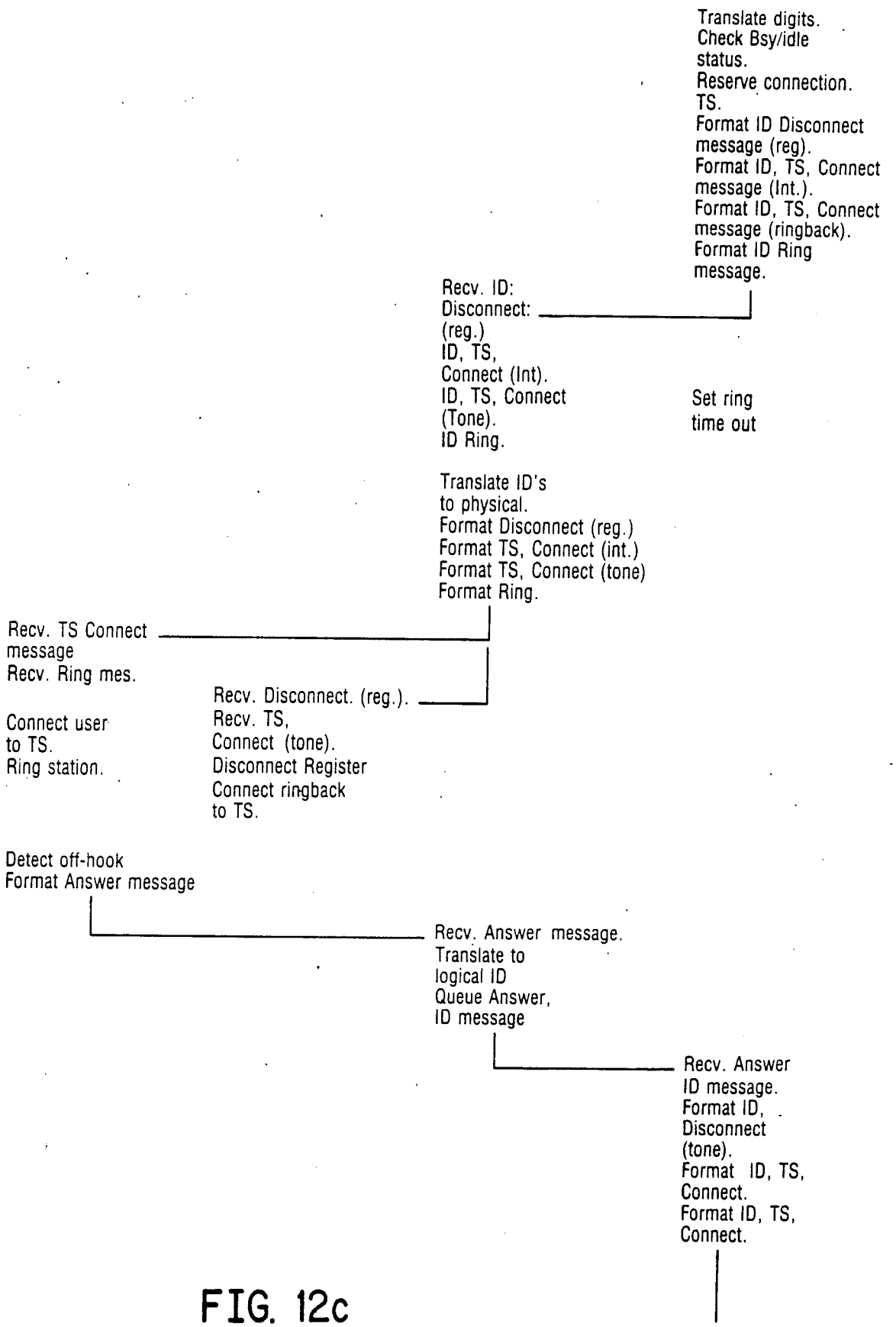
Figure 12D:
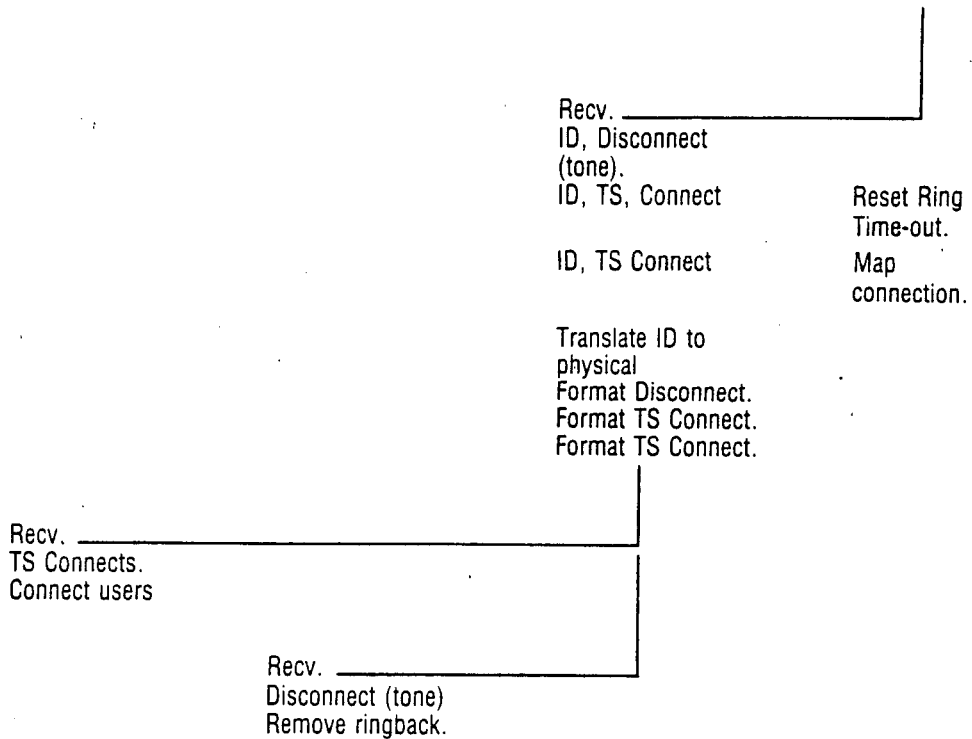

FIG. 11 and 12 are call flow charts which depict the control message flow to and from the user interfaces 38. It can be seen from these charts the orderly flow of information up and down the control structure hierarchy.

The CPU 26 communicates to the Primary Bus 30 using a 3.088 MB serial HDLC link. Each Primary Bus module is strapped with its address and is conditioned to respond to the poll. Using HDLC as the data link protocol, short message (less than 6 bytes) becomes very inefficient due to the protocol overhead. Providing each PRIMARY BUS with a 128 byte buffer will allow for more efficient use of the data link. The multi-function bus 32 can support up to 16K bytes per second of information from the user interface circuits 38. This control data and up to 8K bytes of control data arrive from the host system 12 on the T1 channel, and can be summed up to indicate the maximum data transfer at 26.4K bytes per second. Passing information at 128 bytes per poll, the BIF 40 must be polled 200 times per second or every five milliseconds.

The I/O module 42 serves 6 serial and 2 parallel ports, each with 9.6KB. This provides approximately 8K bits per second of data to the CPU 26. Again, using 128 bytes per poll, the I/O module 42 must be polled every 15 milliseconds. The packet assembler/dissembler (PAD) 46 generates routing information requests to the CPU 26 for each data call. Assuming 10 calls per second and 16 bytes of data per request, the PAD 46 generates only 160 bytes per second of data to the CPU 26. To provide fast response to data call requests, the PAD 46 is polled every 10 milliseconds. The disc interface 44 is treated uniquely. Until command to IPL, the system polling of the disc 44 is for routine maintenance functions. Upon command from the CPU 26, the disc 44 is given full period access to the HDLC link. The data transfer is effected in 4KB segments. Loading of the 512KB of CPU RAM will require 128 block transfers. Ignoring disc latency, loading the CPU RAM will require 1.5 seconds.

The concentrator may be considered a switching network fully distributed using the multi-function bus structure 32 for transport. Each user interface module 38 is equipped with a network interface LSI device which controls access to and from the multi-function bus 32. The network interface LSI device is used generically on all user interfaces 38 which interface to the multi-function bus 32. Under control of the concentrator CPU 26, connection information is written and stored in the work LSI device for the connection duration. The distributed clock and reset signals are used by the LSI device to identify the channel period during which time the multi-function bus 32 is strobed to transmit orreceive data. The network LSI device is also equipped with a control port for interface to a local processor resident on each of the user interface modules 38.

The multi-function network bus 32 is used both in a serial and a parallel format. Intra-concentrator (local) connections use the multi-function bus as a parallel structure. Connections via the T1 channel are transported on the multi-function bus in a serial format. FIG.

Figure 13:
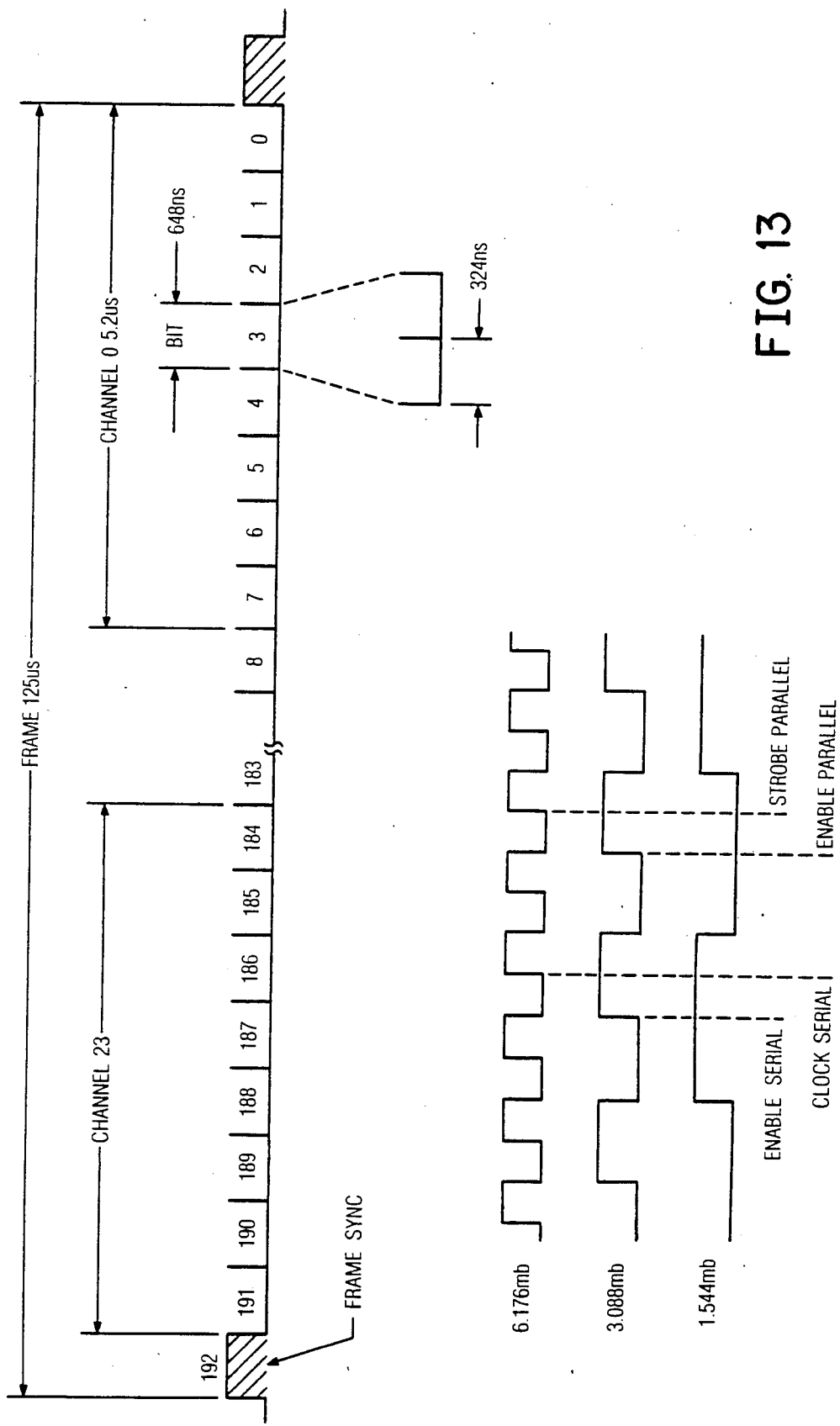
FIG. 13 is a detailed diagram depicting the structure of channels on the multi-function bus.

6 depicts the multi-function bus 32 which is configured from the terminations of up to 4 T1 circuits 50, 52 linking the bus interface module 44 of the concentrator to the host switching system 12. The 4 T1 circuits provide 96 duplex 64KB channels. These 96 channels appear serially on the 8 busses 54 comprising the multi-function bus 32. The 96 duplex channels are split into 4 transmit lines and 4 receive lines. Each of the 8 lines carries 24 64KB channels. Each frame consists of 8 bits, or 192 bits total, for 24 channels to which one bit is appended for framing. As shown in FIG. 13, channel zero consists of bits 0–7, and channel 23 consists of bits 184–191.

Switching on the multi-function bus 32 is done in real time. Pulse code modulated information arriving on the T1 channels 50 52, is directly strobed into the receiving port. Local connections (intra-concentrator) are also real time switched. Descending side of the connection outputs parallel information to the multi-function bus 32. The receiving side of the connection strobes the multi-function bus at the same time to input the information.

Figure 14:
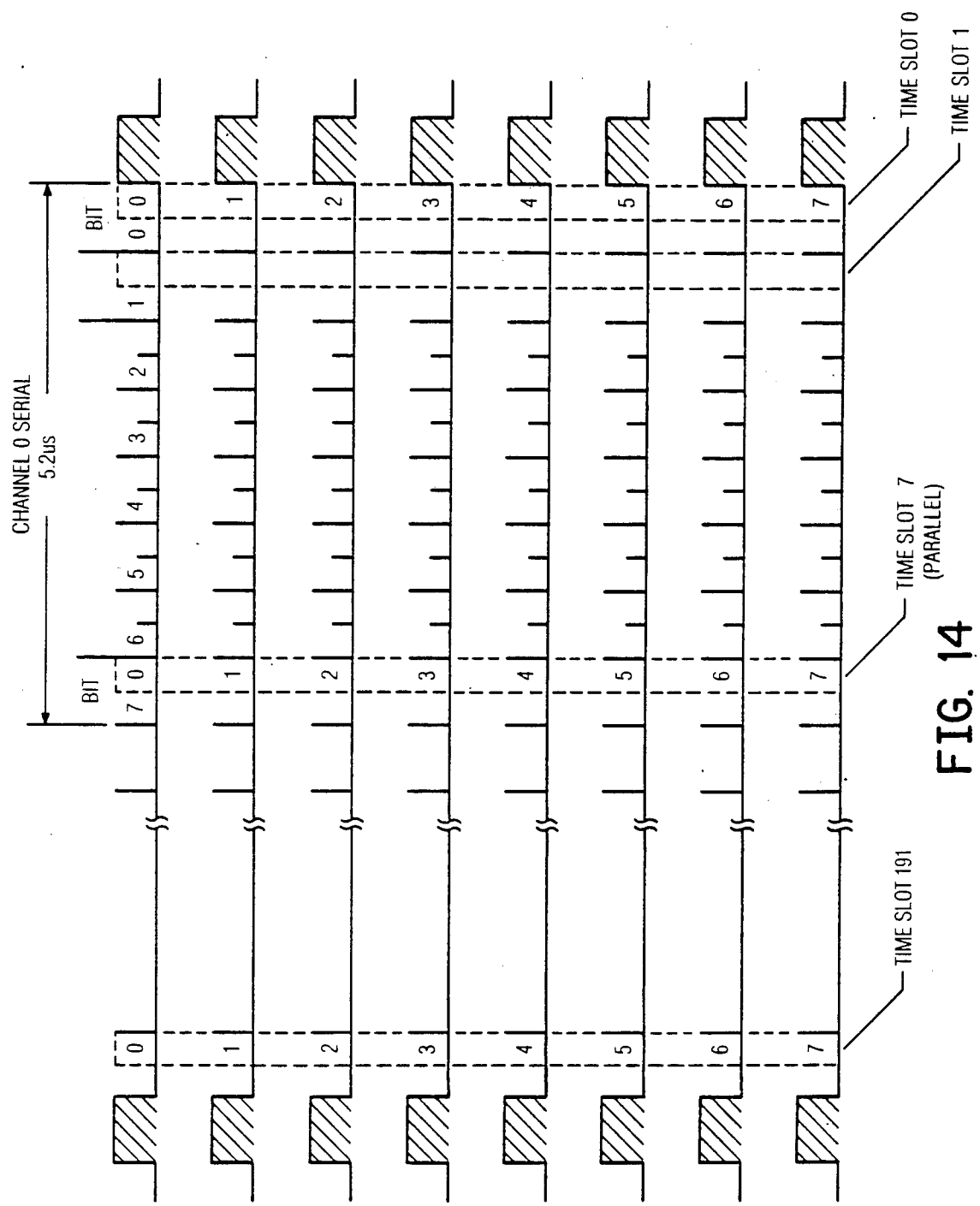
FIG. 14 is a detailed diagram depicting the serial and parallel format of the multi-function bus.

The frame rate is 8 Khz, making the frame period 125 microseconds. The bit period is, therefore, 125 plus 193, or 648 nanoseconds per bit. Referring to the multi-function bus 32 in a parallel sense, there are 123 bit periods, 8 bits wide. The 193 bit period is used as a synchronizing interval for all of the interface circuits 38. The 192 bit periods are 64 KB time slots usable for local intra-concentrator connections. The multi-function capability is achieved by splitting the 648 nanosecond bit in half, using half of the bit period for serial transmission and the second half of the bit period for parallel transmission. This process is shown in FIG. 14. Further attributes designed into the network interface LSI device are the ability to split serial and parallel channels into four-bit segments, and the ability to connect multiple sequential channels. These attributes allow for compressed voice channels at 32KB and extended bandwidth connections up to the 1.536 MB to be switched.

Figure 15:
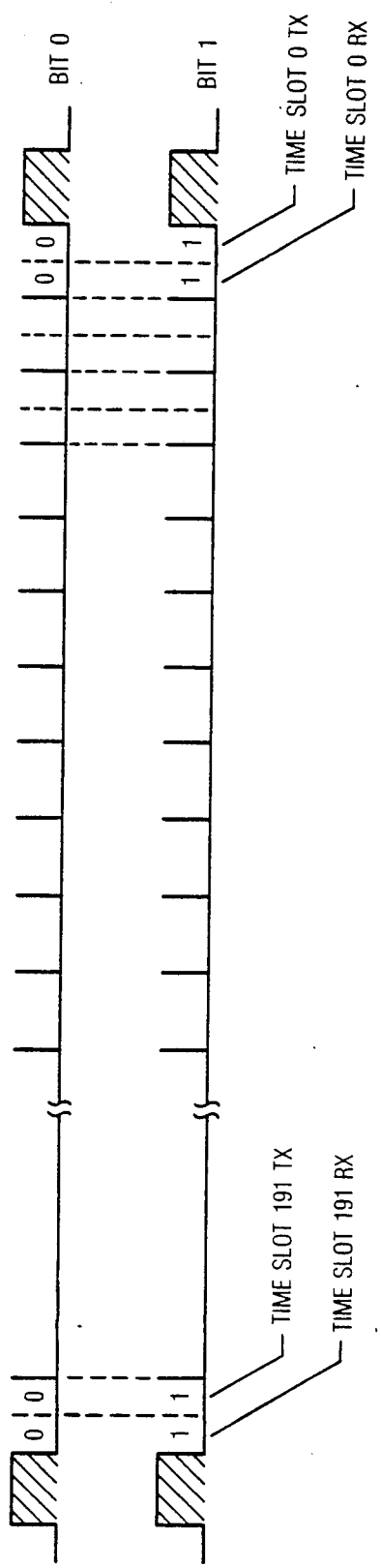
FIG. 15 is a detailed diagram depicting the format for packet data transmission on the multi-function bus.

A further attribute of the concentrator network, is 192 channel fold duplex 16 KB facility. This is implemented by adding 2 busses to the structure. Each user interface 38 requiring access to the packet switching facilities can access the full duplex 16KB channel linking the user interface 38 to the packet assembler/disassembler module 46. The duplex capability of each channel is provided by bit splitting and is done on the multi-function bus 32 for serial and parallel bus access. In this case, however, the time slot is split into a transmit and receive interval. This process is shown in FIG. 15.

Since all of the user interfaces 38 are connected to the multi-function bus 32, and the bus 32 provides an 8-bit parallel structure, it is convenient to allocate 4 of the 192 parallel time slots to provide telephony control access to the user interfaces 38. The four time slots are allocated as follows:

Time Slot A—address byte
Time Slot B—function byte
Time Slot C—data byte
Time Slot D—data byte.

Figure 16:
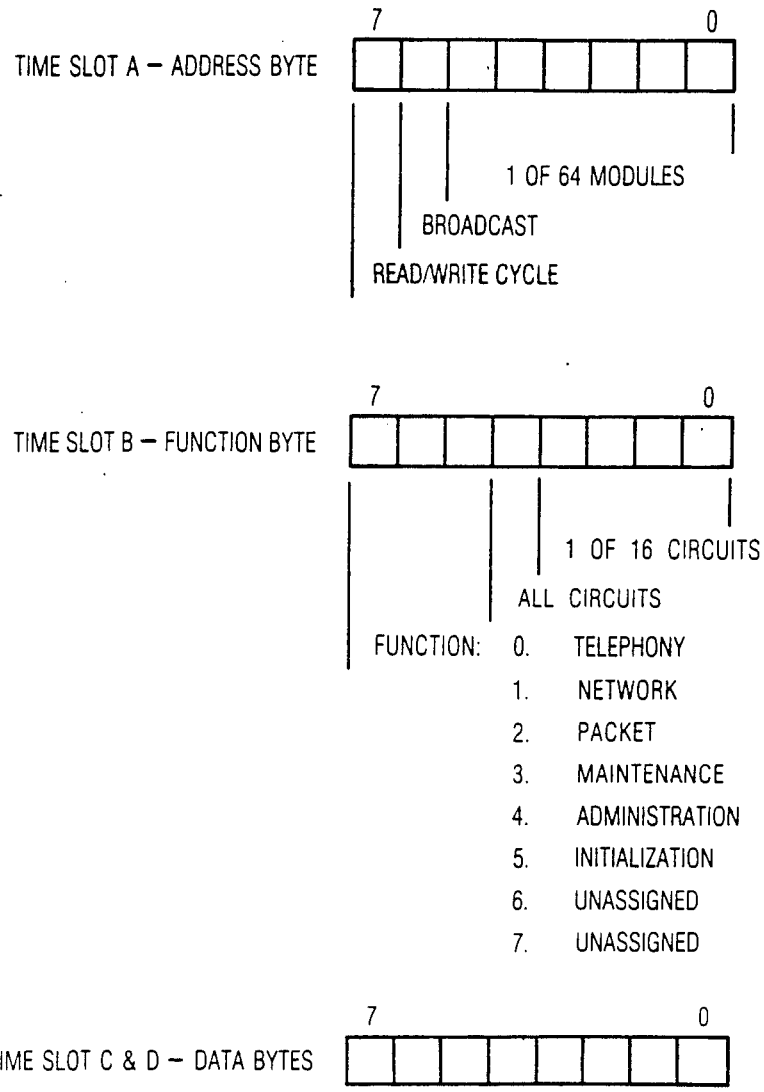
FIG. 16 is a detailed diagram depicting control time slots on the multi-function bus.

FIG. 16 shows a mapping of the information carried on these 4 control access time slots.

The control access via the multi-function bus 32 links the bus interface module 40 to up to 400 locations. Scanning 400 addresses requires 400 by 125 microseconds, or 50 milliseconds. The data rate per port is therefore 16KB per second per 400 ports, or 40 bytes per second per port. This is sufficient for telephony signalling since the user interfaces 38 are equipped to process real time signalling events.

The concentrator control subsystem through the bus interface module 40 is allocated to (redundant) T1 channels for full period control linkage of the host system. The 64KB channels are interfaced in the concentrator at the bus interface module 40. Inter-system control messages are transported over the T1 interface using HDLC. The T1 channel terminates at the frame router and the host switch directed the control messages to the main processor of the host switching 12.

Additional T1 channels are used for user packet data transport. The concentrator packet assembler/disassembler 46 has full access to all of the 96 T1 channels, and is preconditioned to use a specific channel or channels for sending packet information to and from the host system packet frame router.

Clock signals for the concentrator are derived from the T1 bit stream. As such, the concentrator is a synchronized slave to the host clock. The received T1 clock is looped back at the T1 interface to become a transmit clock. The derived clock is used as the time base to perform switching on the multi-function bus 32. Since the clock is derived from the T1 interface, and not locally generated, buffers at the T1 interface are all that is required to maintain synchronization. The T1 interface 36 has a buffer for at least one frame to and from the multi-function bus 32. This will allow all of the T1 transmit and receive busses 54 to be synched to the rest of the reset interval (the 193 bit) of the controlling T1. This, then, will place all four transmit and receive busses 54 in channel alignment on the multi-function bus 32.

The invention is not limited to the particular details of the device depicted herein, and other modifications and applications are contemplated. Certain other changes may be made in the above described device without departing from the true spirit and scope of the invention herein involved. It is intended, therefore, that the above subject matter depicted shall be interpreted as illustrative and not in a limiting sense.

What is claimed is:

1. A multi-function bus for use with a central processor system, user devices having user interfaces and a host switching interface unit, said multi-function bus comprising:

a first pre-determined number of transmit and receive lines connecting a central processing system, the user interfaces and the host switching interface unit;

a second pre-determined number of channels on each of said transmit and receive lines, said channels grouped on said multi-function bus in a frame, each frame having a predetermined number of bits and each bit having a predetermined bit period, each of such channels having end bits and appearing serially within said frame, said frame also including a frame synchronization bit;

means for transferring information to and from said host switching interface in a serial mode on said multi-function bus; and means for transferring information between said central processsding system and said user interfaces in a a parallel mode on said multi-function bus;

said multi-function bus operated in a serial mode, and in a parallel mode, by said first and second means for transferring information by utilizing one-half of each bit period for serially transmission and the other one-half bit period for parallel transmission.

* * * * *